Patented Apr. 18, 1933

1,903,894

UNITED STATES PATENT OFFICE

FRIEDRICH KARL FERTSCH, OF FRANKFORT-ON-THE-MAIN-GRIESHEIM, GERMANY, ASSIGNOR TO I. G. FARBENINDUSTRIE AKTIENGESELLSCHAFT, OF FRANKFORT-ON-THE-MAIN, GERMANY

PROCESS OF PRODUCING VINYL CHLORIDE

No Drawing. Application filed October 22, 1929, Serial No. 401,618, and in Germany December 7, 1928.

This invention relates to the production of vinyl chloride.

Hydrochloric acid may be combined with acetylene, as is well known, preferably by passing equivalent parts of the gaseous hydrochloric acid and acetylene, at temperatures between 150 and 220° C., over porous materials charged with mercury chloride. Besides mercury chloride, it has also been suggested to employ pure metals and acid or basic oxides and salts as catalysts for this purpose. These suggestions, however, were made rather indiscriminately and without reference to specific examples, and it is not known that any of these substances have ever yielded any favourable results. The employment of the most efficient catalyst hitherto known, viz the mercury chloride, entails the disadvantage that it is, in course of time, removed from the porous carrier by volatilization owing to its high vapour tension, so that the efficiency of the contact mass gradually decreases and finally ceases altogether.

I have now found that, by passing hydrochloric acid gas together with purified acetylene over activated carbon as a catalyst at about 160° to 200° C., preferably at about 180° C., an output amounting to nearly the theoretical one of vinyl chloride is obtained. At the same time the disadvantages connected with the use of a volatilizable catalyst such as a mercury chloride, are entirely obviated and the output consequently remains constant for a great length of time. The so-called "acid" activated carbons, that is to say, carbons prepared by carbonizing a carbon-containing material, such as wood which has been impregnated with an acid, such as, for instance, phosphoric acid, are particularly efficient for my purpose. The preparation of such "acid" activated carbons is described, for example, in the German Patents Nos. 371,691 and 408,926. It appears however the acid content of the activated carbon is not indispensable for its use as a catalyst, as "acid" activated carbons, after having been extracted with a solvent such as water, have still proved useful.

The employment of activated carbon as a catalyst in the process in question constitutes a marked improvement over the state of the art, inasmuch as the laborious recovery of the volatilized portions of the rather expensive catalyst formerly used may now be dispensed with.

I claim:—

1. A process of producing vinyl chloride, which comprises passing hydrochloric acid gas together with acetylene over activated carbon at temperatures between 160 and 200° C.

2. A process of producing vinyl chloride, which comprises passing hydrochloric acid gas together with acetylene over "acid" activated carbon at temperatures between 160 and 200° C.

3. A process of producing vinyl chloride, which comprises passing hydrochloric acid gas together with acetylene over activated carbon at about 180° C.

4. A process of producing vinyl chloride, which comprises passing hydrochloric acid gas together with acetylene over "acid" activated carbon at about 180° C.

In testimony whereof, I affix my signature.

FRIEDRICH KARL FERTSCH.